United States Patent [19]
Duncan et al.

[11] 3,816,875
[45] June 18, 1974

[54] MEAT CUTTING AND SLICING METHOD AND APPARATUS

[75] Inventors: William D. Duncan; Carolyn L. Duncan, both of Kokomo, Ind.

[73] Assignee: Duncan Creations, Inc., Marion, Ind.

[22] Filed: May 26, 1971

[21] Appl. No.: 147,038

[52] U.S. Cl............................. 17/52, 17/11, 17/23, 83/169
[51] Int. Cl............................................. A22c 21/00
[58] Field of Search....... 146/73; 17/23, 11; 83/168, 83/169, 171, 471, 491

[56] References Cited
UNITED STATES PATENTS

| | | | |
|---|---|---|---|
| 458,523 | 8/1891 | Elliott | 83/168 |
| 2,169,951 | 8/1939 | Hannan | 17/11 X |
| 2,173,278 | 9/1939 | Kozelka | 83/168 |
| 2,746,495 | 5/1956 | Greenlaw | 83/171 X |
| 3,069,950 | 12/1962 | Hensley | 83/169 X |
| 3,662,430 | 2/1970 | Lloyd et al. | 17/23 |

Primary Examiner—Gil Weidenfeld

[57] ABSTRACT

A meat cutting and slicing method and apparatus comprises the use of a circular knife blade rotated at high speed while the surface of the blade is bathed in a stream of cooling and/or cleaning fluid to provide a film of said fluid on the surface area of the blade in contact with the meat being severed.

5 Claims, 3 Drawing Figures

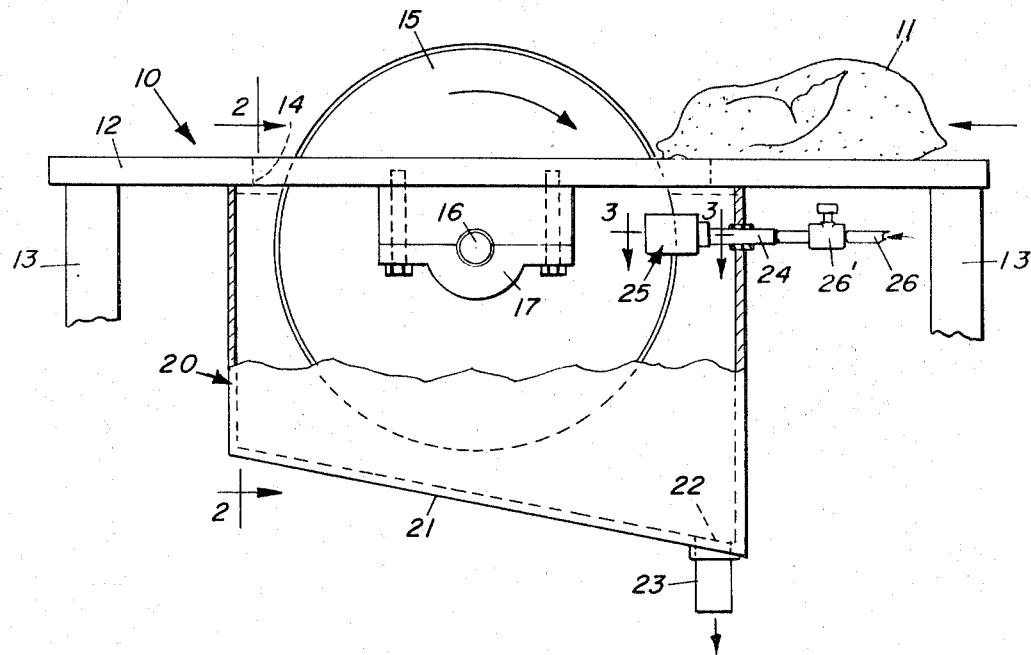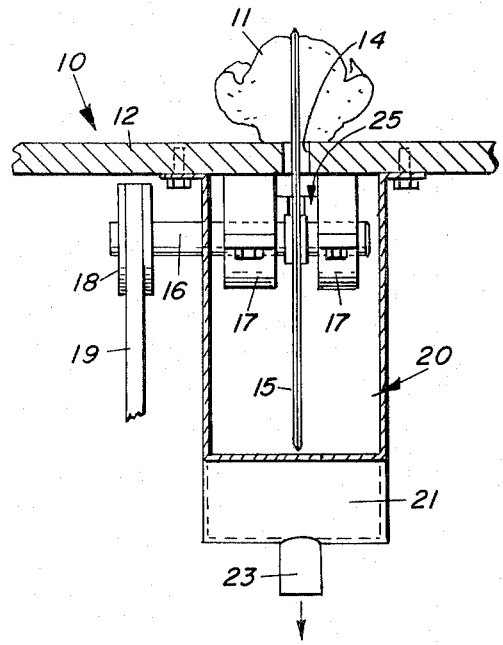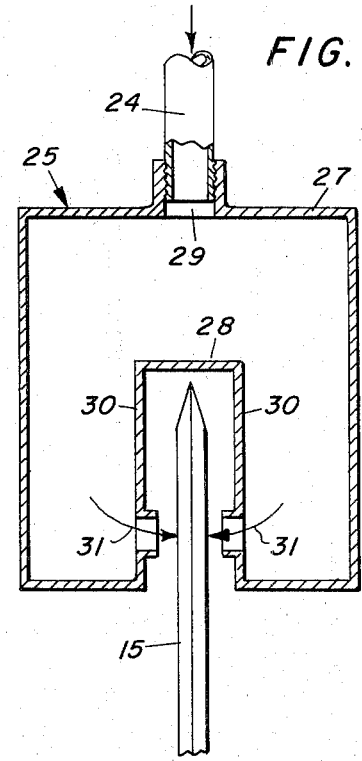

MEAT CUTTING AND SLICING METHOD AND APPARATUS

This invention relates to the art of food preparation and, more particularly, to a method of cutting and/or slicing meat products which involves the use of a circular knife rotated at high speed while the peripheral area of the blade is subjected to the effects of a stream of fluid directed against the surfaces thereof in such a manner that the resulting fluid film produced at the area of contact between the blade and meat product improves the quality and taste of the meat product.

The applicants have discovered that unexpectedly superior improvements are obtained, not only in the ease and efficiency with which meat products can be cut, or sliced, by the herein disclosed invention, but in the quality and appearance of the resulting product, the reduction in bacterial contamination thereof, and the enhancement of the flavor and taste of the product when subjected to further cooking.

The aforementioned improvements in the quality of meat prepared in accordance with this invention have been demonstrated especially in connection with fresh (unfrozen or frozen) poultry, such as chicken and turkey, in which the meat was first severed from the carcass by means of a circular knife driven at speeds much higher than usually employed, during which cutting the area of the knife which was in contact with the meat was continuously covered with a film of water produced by applying a continuous stream of cold water to the knife at a point located immediately beyond the area of contact with the meat during cutting.

While it is not known why the present invention does produce superior results is not fully understood, it is believed that the high rate of speed employed, in which the cutting edge of the knife passes through the meat products at a rate of speed in the neighborhood of 7,000 feet per minute, may be partially responsible in reducing the tearing effect which results from cutting at normal speeds which may be less than one-half of the value employed by applicants. This reduction in the tearing apart of the meat is believed to result in greater retention of natural juices in the meat. At the same time, the friction resulting from these high cutting speeds, which would normally produce excessive heat, causing initial, and unwanted, "burning" of the meat. Therefore, the application of a cooling agent, such as water, to the knife blade prevents this burning while making high speed operation possible. On the other hand, it is further believed that the continuous application of a fluid to the surface area of the knife immediately following its contact with the meat product causes an effect to be produced which is more than the result of a mere cooling of the knife blade. The continual bathing of the surfaces of the knife carries away any bone dust and meat particles which would otherwise cling to the blade and also cleans the blade to prevent the transferrance of bacteria from one cut to another. Finally, it is possible that the fluid applied to the blade may contribute a lubricating effect such as to reduce heat production, although such lubrication is minimal since it is preferable to apply the fluid at a point immediately following contact of the blade with the meat product, and at a rate such that most of the fluid will be thrown off the rotating blade surface by centrifugal force prior to its reengagement with the meat product on a succeeding revolution of the blade. Tests have shown that, while increases in the application of water to the blade produce better results, it is not necessary to apply more than the amount sufficient to cause a slight mist to be thrown off the blade along that portion of its periphery which precedes the area of contact with the meat.

Therefore, some of the advantages believed to result from the practice of this invention are: that meat products cut or sliced in accordance with the apparatus and method disclosed herein have an enhanced flavor and more distinctive taste because they are produced in a cleaner state, have longer shelf life when properly refrigerated and retain their natural juices to a greater extent than when cut, or sliced, by prior methods.

Furthermore, while most of the test work has been conducted with products such as turkey and chicken, experiments conducted with other meat products, such as beef and pork, tend to confirm the above conclusions and, in addition, indicate that increased retention of natural juices takes place regardless of whether the meat is cut with, or against, the natural "grain" of the meat.

Other advantages achieved by this invention result from the fact that dehydration of a meat product cut, or sliced, in accordance with this invention is reduced because of the increased retention of natural juices; thus cooking times may be reduced, since the cooking process is assisted by the presence of these natural juices.

Still another advantage achieved is particularly noticeable in the case of mass preparation of cooked food portions necessary for the operation of so-called "fast-food" restaurants, particularly those serving fried chicken products. In many restaurants of this type it has become the practice to increase the use of additional spices and other condiments designed to obscure deficiencies in taste which appear to result from improper refrigeration, careless selection of the basic food product and other causes related to mass production.

Contrary to the present practice, the use of the apparatus disclosed herein has been shown to produce a better tasting product in mass-production operations with a *reduced* addition of spices and artificial taste stimulants.

This may result from the increased cleanliness possible by use of the present invention, due to the fact that the continual bathing of the knife blade with water prevents any accumulation of residues which tend to build up on the surface of the usual dry blade. Such accumulations require cleaning and scraping of a dry blade after only an hour or so of continuous use, whereas a blade operated in accordance with this invention does not acquire any residue after a full day's continuous use.

Other objects and advantages will be apparent to those skilled in the art after reading the following specification in connection with the annexed drawings, in which:

FIG. 1 is a cross-sectional elevation of a preferred form of apparatus constructed in accordance with the teachings of the invention;

FIG. 2 is a cross-section taken on the line 2—2 of FIG. 1; and

FIG. 3 is a detailed cross-section of the manifold for directing fluid to the surface of a rotating knife blade, taken on the line 3—3 of FIG. 1.

In the drawings, in which a preferred form of meat slicing apparatus according to the teachings of this invention is shown, the numeral 10 includes generally a support for the meat product, such as fowl, indicated generally by numeral 11, which is to be sliced and may include a smooth, flat horizontal table 12 supported on vertical legs 13 and provided with a slotted opening 14 to receive a circular knife blade 15 projecting upwardly therethrough which is mounted on a shaft 16, attached to a pair of bearings 17 secured to the underside of the table and as close thereto as possible for rotation of the blade in a clockwise direction as shown by the arrow.

The shaft may also be provided with a drive connection, such as a pulley 18, which engages with a driving belt 19 connected to the driving pulley (not shown) of a source of motive power (not shown) such as a conventional electric motor. While, for convenience, the shaft is shown as being driven by a conventional V-belt pulley means, it will be obvious that other conventional means can be used to connect a motor with the shaft, such as gearing, or chain mechanisms, bearing in mind that experience indicates that the speed of rotation of the knife 15 should be in the neighborhood of 3,000 rpm, or greater, whereas standard electric motors are commonly designed for speeds of approximately 1,750 rpm.

Attached to the lower surface of the table and completely surrounding the portion of the knife extending below the table is a waterproof housing 20, having a sloping bottom 21 which terminates in a drain opening 22 which can be connected with a floor drain (not shown) by means such as the pipe 23. Contained within the housing, and supported thereby as by means of a short length of pipe 24, is a water distribution manifold, indicated generally by numeral 25 and shown in detail in cross-section in FIG. 3. The end of the pipe 25 attached to the housing may also be provided with a conventional nipple for connection with a source of cold water under pressure (not shown) and supplied through a condint 26, under control of a valve 26'.

The manifold 25 may comprise a hollow enclosure 27, having a reentrantly directed generally C-shaped wall 28 which encloses the peripheral cutting edge and adjacent margins of the knife 15. The housing also is provided with an inlet 29 for cold water and one, or both, of the side walls 30 defining the reentrant portion may be provided with an aperture 31 to direct water against one, or both, of the marginal peripheral areas of the knife blade just after the blade has finished the cutting operation.

In a particular embodiment of the invention, although not to be considered as limiting, the outside diameter of the blade chosen was 9 inches, and the water was initially deposited over approximately 1½ inches of the peripheral surface. By placing the water manifold at a location close to the position closely following the area of contact between the knife and the meat being cut, the result is two-fold: any residue of the meat which might tend to adhere to the knife is immediately flushed away and, excess amounts of water are thrown off into the housing 20 before it can be carried above the table 12 on the return travel of the blade above the table, substantially all of the water being removed from the smooth planar side surfaces of the blade and cutting edge by the time any given segmental area of the blade initially engages the meat product 11. The rate of flow of water can obviously be controlled by valve 26' and the position of the manifold can be varied along the lower portion of the arc of the knife blade, so that excess water will not be thrown out from the blade for a distance substantially more than 180° from the location where it engages the meat product, although in practice a fine mist may still be thrown off along the upper portion of the arc.

While the apparatus is capable of cutting, or slicing, meat products at conventional speeds of rotation, tests have shown condition, flavor and appearance of meat products, such as fresh or frozen chicken or turkey, beef and pork cut at a speed of rotation of the blade in excess of 1,800 rpm is markedly superior to that cut at lower speeds. It is also true that improved retention by the meat of natural moisture and juices, improved flavor and increased distinctness of taste is produced when the speed of rotation exceeded 3,000 rpm, and up to at least 3,550 rpm. In this connection, it should be noted that the volume of water supplied was never sufficient to cause excessive discharge of water by centrifugal force, other than in an atomized mist, to the area surrounding the exposed upper surface of the knife blade and, therefore it is believed that the increased retention of moisture in the meat cut at higher rotational speeds was the result of an unexplained advantage resulting from either the cooling, and/or cleaning effect of water and a reduction in the tearing or shredding effect resulting from contact of the metal knife edge with the meat at greater speeds than normal. It is believed that some of the success of the invention may be attributed to the speed of the knife blade, in view of the fact that the linear rate of speed of the knife edge of a nine inch blade is approximately 7,000 feet per minute when the blade is rotating at 3,000 rpm. At the same time, the enhancement of flavor retention of the meat may possibly be due to the fact that the expected increase in temperature of the blade, which would result from the increased frictional engagement between the metal of the knife blade and the meat at such high speed is effectively prevented by either the cooling effect or a lubricating effect or a combination of both, caused by the addition of water. In these experiments both artificially cooled, and uncooled, water, originating from a natural well was used, the temperature of which did not exceed approximately 65° F. maximum, although it was, in general, decreasing the temperature of the water supplied to the manifold 25, resulted in an increase in the quality of the meat product produced, the minimum temperature actually employed in the tests being in the neighborhood of the freezing point of water.

We claim:

1. Method of cutting and slicing poultry products which comprises the steps of rotating a circular knife blade at a peripheral speed of approximately 4,000 feet per minute, severing said poultry product by engaging the poultry product with the edge of the rotary knife blade and providing relative movement between the poultry product and the axis of rotation of the blade, continuously supplying fluid at a low temperature to the surface of said knife blade adjacent the blade edge generally within an arc approximately 90° at a location following the area of said engagement and at such a rate that the liquid sucessively thrown off the blade by centrifugal force will be substantially removed before completion of a full revolution of the blade, and shielding the poultry product from residues thrown off said blade by centrifugal force.

2. The method as defined in claim 1, wherein said lineal rate of speed is approximately 7,000 feet per minute.

3. The method as defined in claim 2, wherein said supplied fluid comprises water at a temperature below 60° F.

4. The method as defined in claim 3, wherein said liquid is supplied at a temperature above the freezing point of water.

5. The method as defined in claim 3, wherein said water is continuously supplied to opposite sides of said knife blade.

* * * * *